(12) United States Patent
Baron

(10) Patent No.: US 11,527,032 B1
(45) Date of Patent: Dec. 13, 2022

(54) SYSTEMS AND METHODS TO GENERATE AND UTILIZE CONTENT STYLES FOR ANIMATION

(71) Applicant: Mindshow Inc., Los Angeles, CA (US)

(72) Inventor: Gil Baron, Los Angeles, CA (US)

(73) Assignee: Mindshow Inc., Los Angeles, CA (US)

( * ) Notice: Subject to any disclaimer, the term of this patent is extended or adjusted under 35 U.S.C. 154(b) by 0 days.

(21) Appl. No.: 17/718,067

(22) Filed: Apr. 11, 2022

(51) Int. Cl.
G06T 13/80 (2011.01)
G06T 13/20 (2011.01)
G06N 20/00 (2019.01)

(52) U.S. Cl.
CPC .............. *G06T 13/80* (2013.01); *G06T 13/20* (2013.01); *G06N 20/00* (2019.01)

(58) Field of Classification Search
CPC .......... G06T 13/80; G06T 13/20; G06N 20/00
See application file for complete search history.

(56) References Cited

U.S. PATENT DOCUMENTS

| | | | |
|---|---|---|---|
| 8,284,157 B2 | 10/2012 | Markovic | |
| 8,937,620 B1 * | 1/2015 | Teller | G11B 27/031 345/473 |
| 9,159,151 B2 | 10/2015 | Perez | |
| 10,664,045 B2 | 5/2020 | Ross | |
| 10,969,860 B2 | 4/2021 | Ross | |
| 11,231,773 B2 | 1/2022 | Ross | |
| 2002/0105521 A1 | 8/2002 | Kurzweil | |
| 2003/0146915 A1 * | 8/2003 | Brook | G11B 27/11 345/473 |
| 2009/0307189 A1 | 12/2009 | Bobbitt | |
| 2010/0008639 A1 | 1/2010 | Greenberg | |

(Continued)

FOREIGN PATENT DOCUMENTS

WO 2003058518 A2 7/2003

OTHER PUBLICATIONS

Morozov, Mikhail, et al., Asynchronous Immersive Classes in a 3D Virtual World: Extended Description of vAcademia; LNCS 7848, 2013, Special Issue of Transaction on Computational Sciences, (20 pages).

(Continued)

*Primary Examiner* — Michael Le
(74) *Attorney, Agent, or Firm* — Esplin & Associates, PC (57) ABSTRACT

Systems and methods to generate content styles for animation, and to adjust content styles by adjusting virtual style sliders for the content styles are disclosed. Exemplary implementations may: receive, from client computing platforms associated with users, style assignments for final compiled animation scenes; provide a style dial model with the style assignments and the corresponding final compiled animation scenes; train, from i) the style assignments, ii) the corresponding final compiled animation scenes, and iii) animation scene information that defines the final compiled animation scenes, the style dial model to determine individual style correlation values; receive user entry of levels of correlation to individual ones of multiple different content styles; input the animation scene and the levels of correlation to a model that outputs adjusted animation scene information that defines a styled compiled animation scene that has the selected levels of correlation to the individual content styles.

4 Claims, 4 Drawing Sheets

(56) References Cited

U.S. PATENT DOCUMENTS

| | | | |
|---|---|---|---|
| 2011/0064388 A1* | 3/2011 | Brown | H04N 21/816 |
| | | | 704/E13.011 |
| 2015/0243324 A1* | 8/2015 | Sandrew | H04N 13/261 |
| | | | 386/278 |
| 2017/0046906 A1 | 2/2017 | Hilbert | |
| 2017/0061704 A1 | 3/2017 | Gewicke | |
| 2019/0204906 A1 | 7/2019 | Ross | |
| 2020/0066022 A1* | 2/2020 | Leong | G06F 3/0482 |
| 2020/0226724 A1* | 7/2020 | Fang | G06K 9/6256 |
| 2020/0249747 A1 | 8/2020 | Ross | |
| 2021/0200303 A1 | 7/2021 | Ross | |
| 2022/0083130 A1 | 3/2022 | Ross | |

OTHER PUBLICATIONS

Greenhalgh, et al., Temporal Links: Recording and Replaying Virtual Environments, 2000, School of Computer Science and Information Technology, The University of Nottingham (8 pages).

\* cited by examiner

SYSTEMS AND METHODS TO GENERATE AND UTILIZE CONTENT STYLES FOR ANIMATION

FIELD OF THE DISCLOSURE

The present disclosure relates to systems and methods to generate and utilize content styles for animation.

BACKGROUND

Animation generation typically requires frequent adjustments to parameter values that define an animation scene by animators or users of animation software. The adjustments may be especially tedious to adjust the animation scene's content style.

SUMMARY

The present disclosure relates to an initial system or sub-system that trains a style dial model to determine individual style correlation values that represent a presence or portrayal of individual content styles in an animation scene. The style dial model may be trained based on style assignments for final compiled animation scenes and animation scene information for the final compiled animation scenes. The style assignments may be received from the user and include quantifications of one or more of the content styles. The animation scene information may define various attributes that comprise individual final compiled animation scenes.

Based on the style correlation values determined, various individual content styles may be associated with a range that the individual content styles may be portrayed in a given animation scene, and individual values within that range may correspond with particular animation scene information that the given animation scene is to include.

The present disclosure further relates to a system or another sub-system that utilizes the style correlation values determined. Levels of correlation for individual content styles may be selected or otherwise input by user(s) for the given animation scene via virtual dials or virtual sliders. As a result, a styled compiled animation scene may be generated by simply adjusting virtual dials/sliders that correspond to the content styles. Thus, the various content styles may be "dialed" in or out of individual animation scenes.

One aspect of the present disclosure relates to a system configured to generate content styles for animation. Another aspect of the present disclosure relates to the system configured to adjust content styles by adjusting virtual style sliders for the content styles. The system may include one or more of servers configured by machine-readable instructions, electronic storage, and/or other components.

Machine-readable instructions may include one or more instruction components. The instruction components may include computer program components. The instruction components may include one or more of an assignment component, a model training component, a presentation component, a user entry component, styled animation generation component, and/or other instruction components.

The electronic storage may be configured to store final compiled animation scenes, animation scene information, and/or other information. The animation scene information may define the final compiled animation scenes.

The assignment component may be configured to receive style assignments for the final compiled animation scenes. The style assignments may be received from client computing platforms associated with users. The style assignment may quantify one or more content styles that the final compiled animation scenes portray.

The model training component may be configured to provide a style dial model with the style assignments, the corresponding final compiled animation scenes, and/or other information. The model training component may be configured to train the style dial model to determine individual style correlation values. The style dial model may be trained from the style assignments, the corresponding final compiled animation scenes, the animation scene information that defines the final compiled animation scenes, and/or other information. The individual style correlation values may indicate a correlation between a given final compiled animation scene and individual ones of the one or more content styles.

The user entry component may be configured to receive user entry and/or selection of levels of correlation to the individual different content styles. The user entry and/or selection may be received from a client computing platform.

The styled animation generation component may be configured to input the animation scene information and the levels of correlation to a model. The model may output adjusted animation scene information that defines a styled compiled animation scene that has the selected levels of correlation to the individual content styles. The styled animation generation component may be configured to generate the styled compiled animation scene from the adjusted animation scene information.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
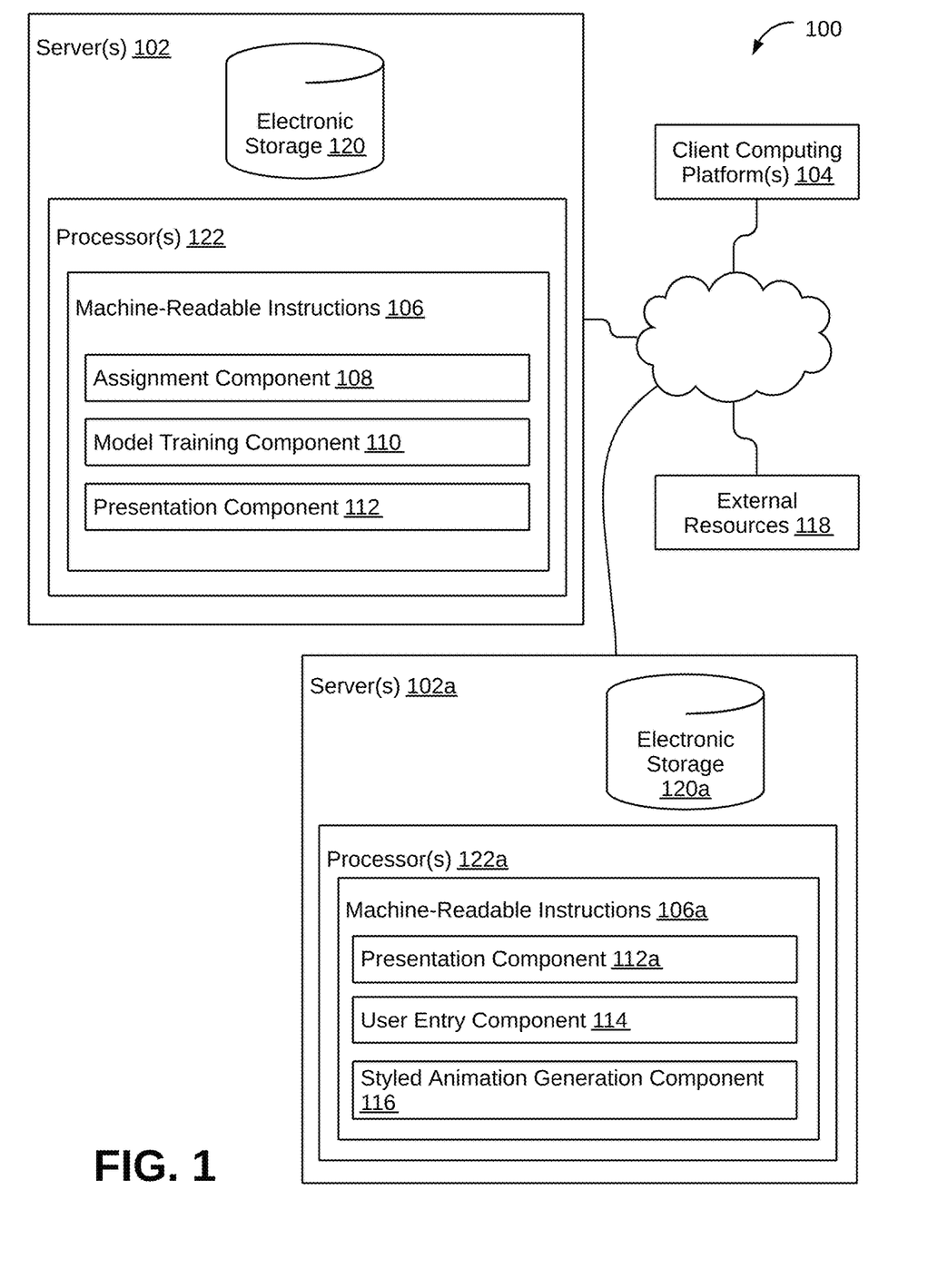
FIG. 1 illustrates a system configured to generate and utilize content styles for animation, in accordance with one or more implementations.

FIG. 1 illustrates a system 100 configured to generate and utilize content styles for animation, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of assignment component 108, model training component 110, presentation component 112, and/or other instruction components.

Electronic storage 120 may be configured to store final compiled animation scenes, animation scene information, and/or other information. The final compiled animation scenes may refer to animation scenes that are finalized for viewing and/or distribution to consumers. The final compiled animation scenes may have been adjusted and/or manipulated by the subjects and/or users to generate such. The consumers may include viewers, subscribers, players, and/or other consumers.

The final compiled animation scenes may be defined by individual animation scene information. The animation scene information may include attributes that comprise the final compiled animation scenes. The attributes may include entity definitions of entities in the final compiled animation scenes, tuning information, animated motions that correspond to motion capture information, animated sound that corresponds to the motion capture information, other animated actions that correspond to the motion capture information, animation setting, and/or other information. The entities may include the characters and inanimate objects. The animated motions, the animated sound, and/or other animated actions may be a rendering of the motion capture information performed by the respective entities. In some implementations, the animated motions, the animated sound, and/or other animated actions may mirror the motion capture information. In some implementations, the animated motions, the animated sound, and/or other animated actions may be different from the exact motion capture information while corresponding to the motion capture information.

Preliminary animation information associated with the final compiled animation scenes may be information received from users and/or subjects that facilitated rendering of initial compiled animation scenes. The initial compiled animation scenes may correspond to the final compiled animation scenes. The initial compiled animation scenes may comprise a version of the final compiled animation scenes that are not finalized for viewing and/or distribution to the consumers. The preliminary information may include the entity definitions, the motion capture information, the tuning information, and/or other information. In some implementations, the attributes of the final compiled animation scenes may be adjusted by users and/or subjects. The animation scene information may further include input refinement information, predicted refinement information, and/or other information.

Entity information for the individual entities may include the entity definitions, the motion capture information, and/or other entity information. The individual entity definitions may define the individual entities in an associated final compiled animation scene. The entity definitions may include entity values that define entity parameters including one or more of a visual appearance, an audio, a location, a pose of the entity, a style of movement, and/or other entity parameters. The visual appearance of the individual entities may include one or more of clothing, height, width, hairstyle, accessories, skin color, headwear, and/or other visual appearances. The audio of the individual entities may include entity voices, entity-initiated noises (e.g., stomp, clap, etc.) and/or other audio related to the individual entities. The audio conveyed by the entities may be based on the sound made by the one or more subjects. Individual locations of the individual entities may change throughout a scene duration. For example, the entities may walk, run, dance, fight, and/or other actions of which change the location of the individual entities. The individual locations of the individual entities may define virtual coordinates within an animation setting that adjust with movement of the entities. Pose of the individual entities may define the posture, attitude of the entity's body, attitude of the entity's head, and/or other poses of the individual entities. The attitude may include values for a yaw angle, a pitch angle, and a roll angle. The style of movement may refer to how the individual entities within the associated final compiled animation scene generally move. For example, how a head, a trunk, and limbs of a human may move is a different style than how a head, a trunk, and limbs of a puppet may move. By way of non-limiting example, the style of movement may include human-like, puppet-like, robotic, barbaric, and/or other styles of movement.

The animation setting may comprise a virtual environment that surrounds one or more of the entities within animation scenes. The virtual environment may comprise a topography, the entities present, simulated physical phenomena (e.g., wind, rain, earthquakes, and/or other phenomena), and/or other elements of the virtual environment. In some instances, the topography may be a 2-dimensional topography. In other instances, the topography may be a 3-dimensional topography. The topography may include dimensions of the space, and/or surface features of a surface or entities (e.g., inanimate objects) that are "native" to the space. In some instances, the topography may describe a surface (e.g., a ground surface) that runs through at least a substantial section of the space. In some instances, the topography may describe a volume with one or more entities positioned therein (e.g., a simulation of gravity-deprived space with one or more celestial bodies positioned therein). For example, the virtual environment may include nature entities (e.g., trees, bodies of water, mountains, etc.), interior entities (e.g., a couch, a chair, a lamp, etc.), and/or other entities.

The motion capture information may be used to generate the associated final compiled animation scene. The motion capture information may reflect the motion and/or the sound made by the one or more subjects as the one or more subjects represent the entities in the associated final compiled animation scene. The motion capture information of the entities may include a change in one or more of the attitudes, the pose, the location, and/or other entity values so that the motion and/or the sound of the entity is depicted. By way of non-limiting example, the motion may include tracking the motion, physical movements, and/or muscle articulations of one or more users. The motion may include one or more of body tracking, physical location tracking, facial tracking, eye tracking, hand tracking, foot tracking, elbow tracking, knee tracking, and/or any type of tracking that may enable recording and/or capture of users' motions, physical movements, muscle articulations, expressions, postures, reflexes, and/or other motions and/or movements.

The tuning information may define values to animation parameters for the associated final compiled animation scene. The tuning information may include values that define the animation parameters that include one or more of visual attributes, ambient audio, lighting, the style of movement for all entities, an animation style, and/or other animation parameters. The visual attributes include one or more of a color, shading, a pattern, a texture, and/or other parameters for visual attributes. Ambient audio may include one or more background noises such as car traffic, animal noises (e.g., dog barking, birds chirping), talking, and/or other ambient audio. Lighting may include ambient lighting, spot lighting, accent lighting, and/or other lighting. The animation style may be one of stop motion, two-dimensional motion, three-dimensional motion, traditional animation, motion graphics, Claymation, and/or other animation styles.

The input refinement information may include adjustments to the preliminary animation information, the initial compiled animation scenes, the animation setting, and/or other information. The adjustments may refine the initial compiled animation scenes to the final compiled animation scenes. For example, the adjustments to the preliminary animation information may include adjustments to the height of a given entity, the skin color of a character entity, the topography of the animation setting, and/or other adjustments. In some implementations, the input refinement information may include adjustments to the animated motions, the animated sound, and/or other animated actions.

The predicted refinement information may be predicted by an animation prediction model where the predicted refinement information refines an input animation scene to an output animation scene. The predicted refinement information may include adjustments to the entity definitions for the entities; adjustments to the animated motions, the animated sounds, and/or the other animated actions made by the entities in the input initial compiled animation scene; changes to the attributes of the input initial compiled animation scenes; adjustments to the tuning information; adjustments to the animation setting, and/or other predicted refinement information. In some implementations, the predicted refinement information may reflect subject input and/or user input. The animation prediction model may be trained as described in co-pending U.S. application Ser. No. 17/705,028 entitled "SYSTEMS AND METHODS CONFIGURED TO FACILITATE ANIMATION GENERATION", the disclosure of which is incorporated by reference in its entirety herein.

In some implementations, presentation component 112 may be configured to present the final compiled animation scenes to the users via the client computing platforms 104. The presentation of the final compiled animation scenes may facilitate the users in providing style assignments for individual ones of the final compiled animation scenes. Presentation component 112 may be configured to enable playback, pausing, slow-motion playback, sped-up playback, and/or other presentations of the final compiled animation scenes for the users.

Assignment component 108 may be configured to receive the style assignments for final compiled animation scenes. The style assignments may be received from client computing platforms 104 associated with users. The style assignments may quantify one or more content styles that the final compiled animation scenes portray. In some implementations, presentation component 112 may be configured to present a user interface of user interface elements that includes the presentation of the final compiled animation scenes that enable the users to input the style assignments. The user interface may include virtual buttons, dropdown menus, text boxes, and/or other user interface elements that enable the users to input the style assignments.

The style assignments received from client computing platforms 104 may include the one or more content styles and assigned values to the provided one or more content styles. That is, the users may specify the one or more content styles and specify how much the individual final compiled animation scenes portray the individual one or more content styles. In some implementations, some of the one or more content styles provided in the style assignments may be created and input by the users. That is, some of the content styles may be new to system 100 and not yet stored in electronic storage 120. In some implementations, some of the one or more content styles provided in the style assignments may be previously created and stored in electronic storage 120. The known and stored content styles may be presented to the users via the user interface to enable the users to select one or more of the content styles. For example, a dropdown menu and/or check boxes of the content styles stored in electronic storage 120 may be presented.

The content styles may characterize movement styles, visual styles, and/or other styles for content. A movement style may characterize a movement of animation in a scene. By way of non-limiting example, the movement styles may include anime, car stunts, clay-style animation, realistic human, squash and stretch, puppetry, anime, stop motion, hard tangent, and/or other content styles where the portrayal of such may be quantified. A visual style may characterize how the animation itself looks. By way of non-limiting example, the visual styles may include sketch drawing, cartoon, comic book, and/or other visual styles. In some implementations, the one or more content styles may be separate from each other. In some implementations, two of the content styles may oppose each other, and thus be related. For example, a driver's education style of driving may oppose a Fast & Furious style of driving in an animation scene.

Individual ones of the assigned values to the content styles may be a percentage, a proportion, a number closer to one content style more than an opposing content style, or other unit of measure. For example, a particular animation scene may be 70% a first content style. As another example, the particular animation scene may be 3 out of 5 of a second content style. As another example, the particular animation scene may be 3 units, from a midpoint between a third content style and a fourth content style, towards the third content style. The unit of measure for the assigned values may be predetermined, set by an administrative user of system 100, or set by the users inputting via client computing platforms 104. In some implementations where the unit of measure in predetermined, the unit of measure (e.g., a percentage) may be indicated to the users via client computing platforms 104 so that the assigned values input by the users are in accordance with the unit of measure (e.g., 20%, 25%, 50%, etc.).

By way of non-limiting example, a first style assignment for a first final compiled animation scene, a second style assignment for a second final compiled animation scene, and/or other style assignments for other ones of the final compiled animation scenes may be received. The first style assignment may include a first assigned value to the first content style. The second style assignment may include a second assigned value (e.g., 4 out of 5) to the first content style and a third assigned value (e.g., 5 out of 5) to the second content style. The first content style may be known to system 100 and stored in electronic storage 120 and the second content style may be created and input by a user.

In some implementations, model training component 110 may be configured to determine whether the one or more content styles created by the users and/or stored in electronic storage 120 refer to substantially the same content style. Determining whether content styles are substantially the same content style may include known or novel term comparison techniques, machine learning, and/or other determination techniques. For example, the first style assignment may include "Japanese animation" as one of the content styles, and the second style assignment may include "anime" as one of the content styles. The content styles included in the first style assignment and the second style assignment may refer to the substantially the same content style that has more than one known name. In some implementations, synonymous names for a content style may be defined by the users for storage in electronic storage 120.

In some implementations, model training component 110 may be configured to determine two or more content styles from a single content style included in the style assignments. For example, the first content style may be "clay animation". Model training component 110 may determine stop-motion animation as a first sub-content style of the first content style and clay as a second sub-content style (e.g., the characters and other entities in an animation scene look to be crafted out of clay). In some implementations, the two or more content styles determined from the single content style may be presented to the user. Model training component 110 may prompt the user for assigned values to the two or more content styles determined. The assigned values for the two or more content styles received from the user may be included in the respective style assignment the single content styles originated from.

Model training component 110 may be configured to provide a style dial model with the style assignments, the corresponding final compiled animation scenes to the style assignments, the animation scene information, and/or other information. Model training component 112 may be configured to train the style dial model to determine individual style correlation values. The style dial model may be trained from i) the style assignments, ii) the corresponding final compiled animation scenes, and iii) the animation scene information that defines the final compiled animation scenes, and/or other information. The individual style correlation values may indicate a correlation between a given final compiled animation scene and individual ones of the one or more content styles. The correlation between the given final compiled animation scene and the individual content styles may correspond to particular animation scene information that defines the given final compiled animation scene and the assigned values to the individual content styles. In some implementations, the correlation style values determined may be the percentage or the proportion based on and in accordance with the unit of measurement of the assigned values. In some implementations, the correlation style values may be calculated based on the assigned values, the animation scene information, and/or other information. In some implementations, the correlation style values may be determined upon receipt of a plurality of the style assignments so that the correlation styles values are based on the plurality of content styles, the plurality of the assigned values, the final compiled animation scenes, the animation scene information thereof, and/or other information.

By way of non-limiting illustration, a first correlation style value may be determined from the first assigned value, the second assigned value, the first final compiled animation scene, the second final compiled animation scene, and/or other information. The first correlation style value may correspond to particular animation scene information that defines a final compiled animation scene. The first correlation style value and the corresponding animation scene information may be stored to electronic storage 120.

Server(s) 102a may be configured by machine-readable instructions 106a. Machine-readable instructions 106a may include one or more instruction components. Server(s) 102a may include electronic storage 120a. Server(s) 102a, machine-readable instructions 106a, and electronic storage 120a may be similar to server(s) 102, machine-readable instructions 106, and electronic storage 120, respectively, as described herein but included in server(s) 102a.

Electronic storage 120a may be configured to store compiled animation scenes, the animation scene information that defines individual ones of the compiled animation scenes, and/or other information. The compiled animation scenes stored may include output compiled animation scenes generated based on the predicted refinement information predicted by the animation prediction model, the final compiled animation scenes, compiled animation scene drafts, and/or other compiled animation scenes. In some implementations, electronic storage 120a may be the same as electronic storage 120.

The instruction components may include computer program components. The instruction components may include one or more of presentation component 112a, user entry component 114, styled animation generation component 116, and/or other instruction components. In some implementations, presentation component 112a, user entry component 114, styled animation generation component 116, and/or other instruction components may be executed by server(s) 102. In some implementations, assignment component 108, model training component 110, presentation component 112, and/or other instruction components may be executed by server(s) 102a.

User entry component 114 may be configured to receive user entry and/or selection of one or more levels of correlation to the one or more different content styles for a compiled animation scene. The compiled animation scenes stored in electronic storage 120a may include the compiled animation scene. The user entry and/or selection may be received from client computing platform 104. A level of correlation to individual content styles may be a value that represents how present the individual content styles are in a styled compiled animation scene. The levels of correlation may correspond to particular animation scene information as determined by the style dial model. The user entry and/or selection of the levels of correlation may be input via user interface elements. The user interface elements may be included in the user interface presented to the users via client computing platforms 104. In some implementations, the user input may include one level of correlation to one of the content styles. In some implementations, the user input may include multiple content styles and corresponding levels of correlation thereof.

In some implementations, presentation component 112a may be configured to present different virtual style sliders or virtual dials (i.e., the user interface elements) concurrent to presentation of the compiled animation scene. As such, the user entry and/or the selection of the levels of correlation to the individual different content styles are received via the individual virtual style sliders or the virtual dials. Individual ones of the levels of correlation may facilitate an animation styling model with outputting of different adjusted animation scene information.

Styled animation generation component 116 may be configured to input the animation scene information of the compiled animation scene and the levels of correlation to the animation styling model. The animation styling model may output adjusted animation scene information that defines the styled compiled animation scene that has the selected levels of correlation to the individual content styles. That is, styled animation generation component 116 may adjust the animation scene information of the compiled animation scene to achieve the selected levels of correlation (in accordance with the animation scene information determined by the style dial model) and thus generate the adjusted animation scene information. The adjusted animation scene information may define the styled compiled animation scene. For example, the styled compiled animation scene may be a variation of an output compiled animation scene or a variation of a final compiled animation scene. Thus, styled animation generation component 116 may be configured to generate the styled compiled animation scene from the adjusted animation scene information.

In some implementations, presentation component 112a may be configured to effectuate presentation of the styled output compiled animation scene contemporaneous to the generation in accordance with the adjusted animation scene information. Thus, the users may view the generation of the styled compiled animation scene in real-time via client computing platforms 104. In some implementations, the user interface may include user interface elements to save the styled compiled animation scene to drafts in electronic storage 120a, transmit the styled compiled animation scene to another client computing platform 104, finally generate and export the styled compiled animation scene, and/or other actions.

The training and utilization of the style dial model may improve existing computer animation techniques by adjusting the animation scene information (i.e., various attributes that comprise individual animation scenes) to immediately portray a given animation scene with more or less of one or more content styles. Such immediate adjustments may eliminate the need of the users, subjects, or animators to reconfigure, redefine, or re-generate the animation scene from the beginning and/or via analysis and adjustment of a plurality of the attributes. Furthermore, training and utilization of the style dial model may initiate or facilitate development of user-friendly computer animation for individual people from their own computers in addition to animation creators. As such, the improvement to technology or the technical field of computer animation may expedite production of computer animation products.

Figure 3:
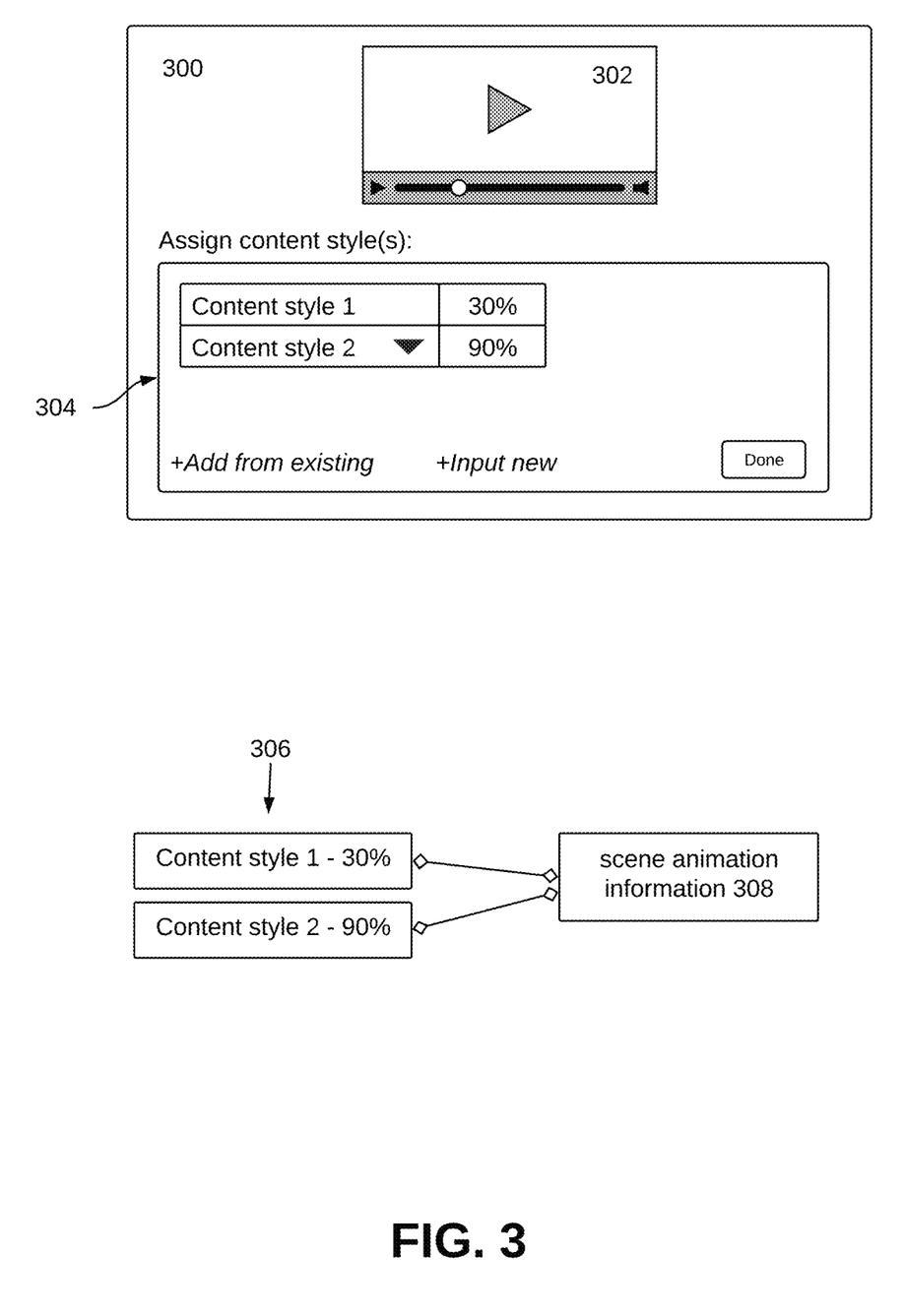
FIG. 3 illustrates an example implementation of the system configured to generate and utilize content styles for animation, in accordance with one or more implementations.

FIG. 3 may illustrate an example implementation, in accordance with one or more implementations. FIG. 3 illustrates a user interface 300 presented via a client computing platform. User interface 300 may include a final compiled animation scene 302 and user interface elements 304. The user interface elements 304 may enable a user to input content styles and assigned values for the content styles. Such content styles and assigned values may comprise a style assignment 306 as described in FIG. 1. Individual content styles and their assigned values of style assignment 306 may correspond with scene animation information 308 that defines final compiled animation scene 302.

Figure 4:
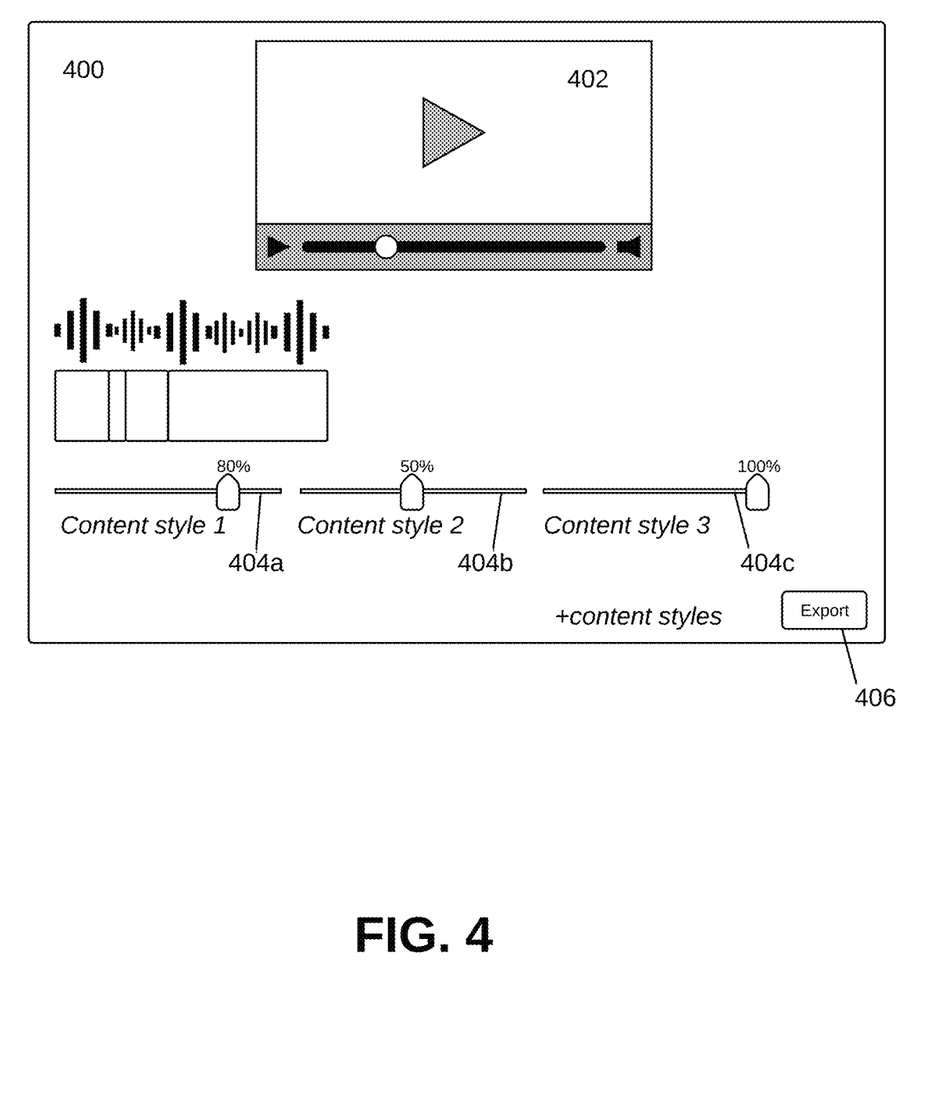
FIG. 4 illustrates an example implementation of the system configured to generate and utilize content styles for animation, in accordance with one or more implementations.

FIG. 4 may illustrate an example implementation, in accordance with one or more implementations. FIG. 4 illustrates user interface 400 presented via a client computing platform to a user. User interface 400 may include a compiled animation scene 402. Compiled animation scene 402 may be generated based on predicted refinement information predicted by an animation prediction model or already be finalized for viewing. As such, a styled compiled animation scene may be generated from various initial sources. User interface elements 404a-c (e.g., virtual sliders) may enable a user to provide levels of correlation to content styles. The levels of correlation input by the user may adjust compiled animation scene 402 in real-time to generate the styled compiled animation scene. The styled compiled animation scene may be generated, stored, and/or transmitted upon selection of an export button 406.

Referring back to FIG. 1, in some implementations, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program components. The computer program components may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute components 108, 110, 112, 114, 116, and/or 112a, and/or other components. Processor(s) 122 may be configured to execute components 108, 110, 112, 114, 116, and/or 112a, and/or other components by software; hardware; firmware; some combination of software, hardware, and/or firmware; and/or other mechanisms for configuring processing capabilities on processor(s) 122. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 112a are illustrated in FIG. 1 as being implemented within a single processing unit, in implementations in which processor(s) 122 includes multiple processing units, one or more of components 108, 110, 112, 114, 116, and/or 112a may be implemented remotely from the other components. The description of the functionality provided by the different components 108, 110, 112, 114, 116, and/or 112a described below is for illustrative purposes, and is not intended to be limiting, as any of components 108, 110, 112, 114, 116, and/or 112a may provide more or less functionality than is described. For example, one or more of components 108, 110, 112, 114, 116, and/or 112a may be eliminated, and some or all of its functionality may be provided by other ones of components 108, 110, 112, 114, 116, and/or 112a. As another example, processor(s) 122 may be configured to execute one or more additional components that may perform some or all of the functionality attributed below to one of components 108, 110, 112, 114, 116, and/or 112a.

Figure 2:
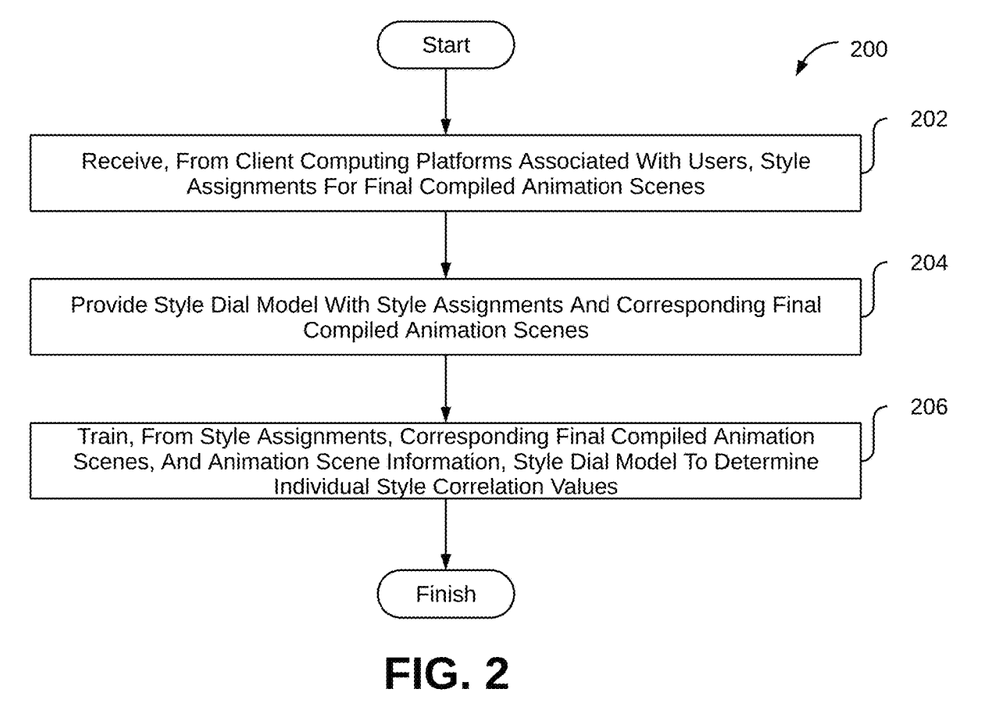
FIG. 2 illustrates a method to generate content styles for animation, in accordance with one or more implementations.

FIG. 2 illustrates a method 200 to generate content styles for animation, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving, from client computing platforms associated with users, style assignments for final compiled animation scenes. The style assignments may quantify one or more content styles that the final compiled animation scenes portray. Operation 202 may be performed by one or more hardware processors configured by machine-readable instructions including a component that is the same as or similar to assignment component 108, in accordance with one or more implementations.

An operation 204 may include providing a style dial model with the style assignments and the corresponding final compiled animation scenes. Operation 204 may be performed by one or more hardware processors configured by machine-readable instructions including a component that is the same as or similar to model training component 110, in accordance with one or more implementations.

An operation 206 may include training, from the style assignments, the corresponding final compiled animation scenes, and the animation scene information, the style dial model to determine individual style correlation values. The individual style correlation values may indicate a correlation between a given final compiled animation scene and individual ones of the one or more content styles. Operation 206 may be performed by one or more hardware processors configured by machine-readable instructions including a component that is the same as or similar to model training component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to adjust content styles by adjusting virtual style sliders for the content styles, the system comprising:

electronic storage configured to store compiled animation scenes and animation scene information that defines the compiled animation scenes;

one or more processors configured by machine-readable instructions to:

present individual different virtual style sliders;

receive, from a client computing platform, user entry and/or selection of levels of correlation to individual different content styles for a compiled animation scene, wherein the compiled animation scene is presented concurrent to the presentation of the different virtual style sliders, wherein the user entry and/or the selection of the levels of correlation to the individual different content styles are received via the individual different virtual style sliders;

input the animation scene information that defines the compiled animation scene and the levels of correlation to an animation styling model, wherein the animation styling model outputs adjusted animation scene information defining a styled compiled animation scene that has the levels of correlation to the individual different content styles entered and/or selected via the different virtual style sliders based on the levels of correlation and the animation scene information inputted; and generate, using the animation styling model, the styled compiled animation scene from the adjusted animation scene information.

2. The system of claim 1, wherein the one or more processors are further configured by the machine-readable instructions to:

effectuate presentation of the styled compiled animation scenes contemporaneous to the generation.

3. A method to adjust content styles by adjusting virtual style sliders for the content styles, the method comprising:

storing, in electronic storage, compiled animation scenes generated by an animation prediction model and animation scene information that defines the compiled animation scenes;

presenting individual different virtual style sliders;

receiving, from a client computing platform, user entry and/or selection of levels of correlation to individual different content styles for a compiled animation scene, wherein the complied animation scene is presented concurrent to the presentation of the different virtual style sliders, wherein the user entry and/or the selection of the levels of correlation to the individual different content styles are received via the individual virtual style sliders;

inputting the animation scene information that defines the compiled animation scene and the levels of correlation to an animation styling model, wherein the animation styling model outputs adjusted animation scene information defining a styled compiled animation scene that has the levels of correlation to the individual different content styles entered and/or selected via the different virtual style sliders based on the levels of correlation and the animation scene information inputted; and generating, using the animation styling model, the styled compiled animation scene from the adjusted animation scene information.

4. The method of claim 3, further comprising:

effectuating presentation of the styled compiled animation scene contemporaneous to the generation.

* * * * *

UNITED STATES PATENT AND TRADEMARK OFFICE
CERTIFICATE OF CORRECTION

| | | |
|---|---|---|
| PATENT NO. | : 11,527,032 B1 | |
| APPLICATION NO. | : 17/718067 | |
| DATED | : December 13, 2022 | |
| INVENTOR(S) | : Gil Baron | |

It is certified that error appears in the above-identified patent and that said Letters Patent is hereby corrected as shown below:

In the Claims

In Claim 3, Column 14, Line 24, delete "individual", therefor.

Signed and Sealed this
Thirty-first Day of January, 2023

*Katherine Kelly Vidal*

Katherine Kelly Vidal
*Director of the United States Patent and Trademark Office*